United States Patent [19]

Olschewski et al.

[11] 4,306,641
[45] Dec. 22, 1981

[54] NOISE REDUCING CLUTCH DISENGAGEMENT

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 95,585

[22] Filed: Nov. 19, 1979

[30] Foreign Application Priority Data

Nov. 24, 1978 [DE] Fed. Rep. of Germany ... 7834928[U]

[51] Int. Cl.³ ............................................ F16D 23/14
[52] U.S. Cl. .................................. 192/98; 192/30 V; 192/110 B
[58] Field of Search ................ 192/30 V, 99 R, 99 A, 192/110 B, 110 R, 109 B, 98; 308/233, 187.2, 230

[56] References Cited

U.S. PATENT DOCUMENTS

| | | | |
|---|---|---|---|
| 3,525,557 | 8/1970 | Willing | 308/233 |
| 3,604,545 | 9/1971 | Bourgedis | 192/30 V |
| 4,013,327 | 3/1977 | Kunkel et al. | 308/233 X |
| 4,094,394 | 6/1978 | Koder et al. | 192/110 B |

*Primary Examiner*—George H. Krizmanich
*Attorney, Agent, or Firm*—Daniel M. Rosen

[57] ABSTRACT

In a noise reducing disengagement device for motor vehicle clutches having rolling elements and adapted to be radially displaceable with respect to a sliding sleeve, the bearing includes an apertured fixed race having a radially directed flange on a plate fixedly mounted with respect to the sleeve. The fixed race has a damping ring coupled thereto and contacting the flange on the side toward the rolling elements, and at least three damping members distributed on the circumference of the plate. The plate includes a plurality of recesses, the damping members passing through the apertures in the fixed race and entering the recesses in the plate.

13 Claims, 7 Drawing Figures

NOISE REDUCING CLUTCH DISENGAGEMENT

BACKGROUND OF THE INVENTION

The present invention relates to clutch bearings and particularly to arrangements for damping bearing movement. To avoid chatter in the confinement of relative movements of the fixed race of a self-centering clutch bearing and the sliding sleeve of a clutch disengagement, it is necessary to provide damping means.

For this purpose, it is known that a damping ring may be used, for example in the bore of the fixed race. The damping ring is provided with separate elastic members for damping movements of the bearing in the radial and the circumferential direction. This known damping ring requires a comparatively large structural space.

It is also known to provide a comparatively thin disc of an elastic material between the pressure plate of a sliding sleeve and the fixed race of a clutch bearing, with convexities entering into recesses of the plate, for example by projections arranged at the flange of the fixed race. However, these known damping means may be damaged in violent concussions.

SUMMARY OF THE INVENTION

The present invention is therefore directed to an improved clutch disengagement device particularly for motor vehicle clutches, wherein a clutch bearing is arranged to be radially displaceable on or in a sliding sleeve or the like. The fixed race of the bearing has a radially directed flange, preferably in contact with a plate connected to the sliding sleeve or the like, to provide engagement surface for the clutch actuating means. The damping ring is so constructed and arranged in the clutch bearing that it occupies little structural space and is not exposed to wear, even in violent concussions.

The damping ring according to this invention is preferably made of synthetic material and may be efficiently and inexpensively produced by casting or injection molding. It is moreover easily installed, and serves simultaneously as a seal against leakage of grease from the clutch bearing.

In addition, the present invention provides a favorable arrangement for damping relative movement of the clutch bearing, so that the damping members cannot be damaged even upon maximum displacement of the clutch bearing.

A further modification provides a simple method of securing the damping ring against rotation in addition, each damping member and end stop require only one aperture in the outer race of the clutch bearing and one recess in the plate finally, the damping member acts to seal the clutch bearing against grease leakage.

DESCRIPTION OF THE FIGURES

The invention will now be described in more detail with reference to preferred embodiment, and in conjunction with the appended drawings, wherein.

DETAILED DESCRIPTION OF THE INVENTION

Figure 1:
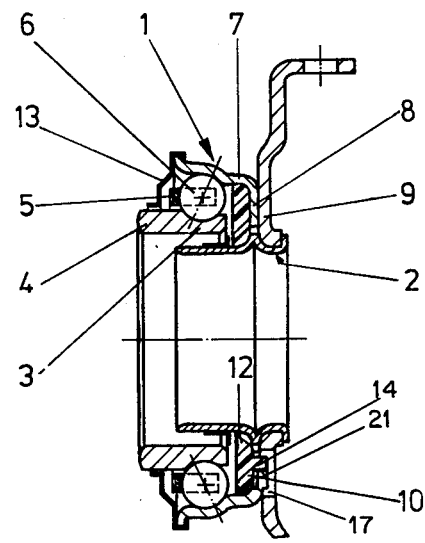
FIG. 1 is a sectional view showing a clutch disengagement device according to the present invention.
Figure 3:
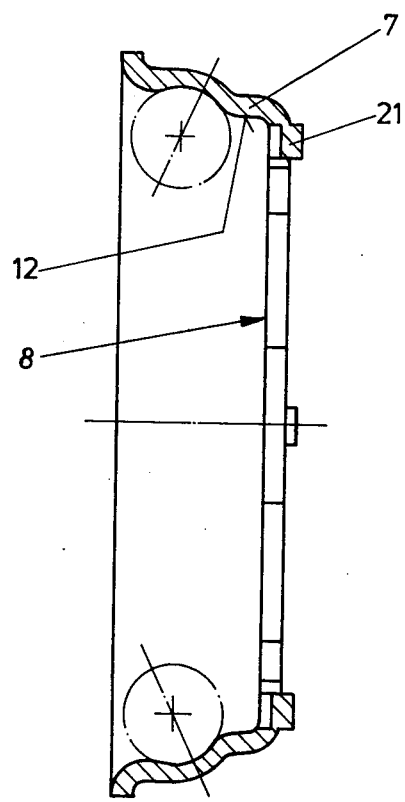
FIG. 3 shows the outer race of the clutch bearing, in sectional view.
Figure 5:
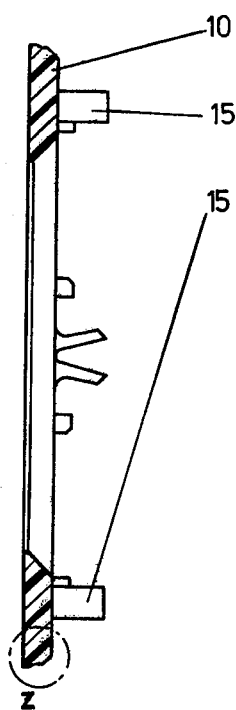
FIG. 5 shows a cross section of a damping ring.
Figure 6:
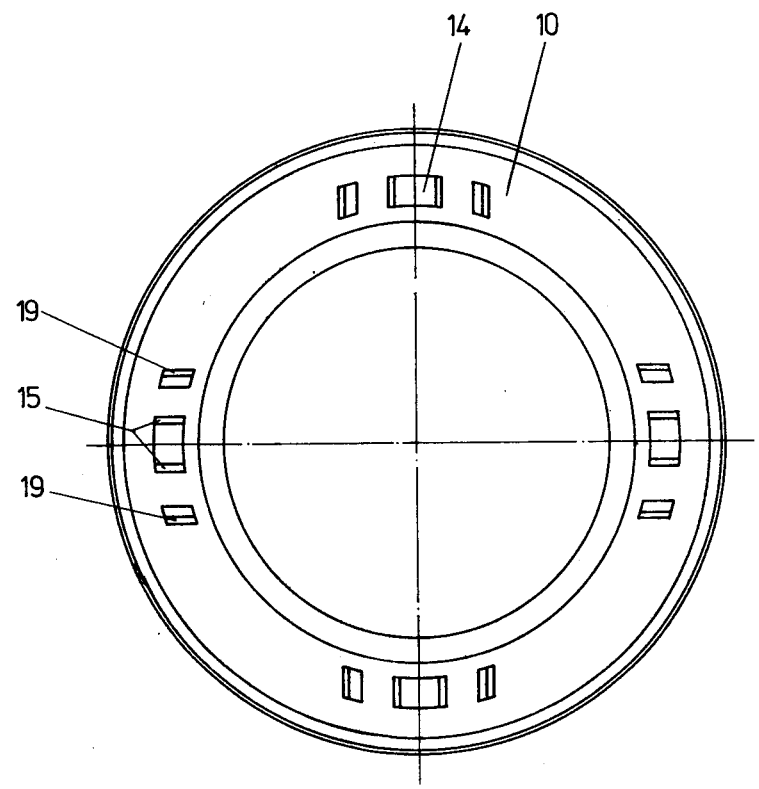
FIG. 6 shows a right side view of the damping ring of FIG. 5.
Figure 7:
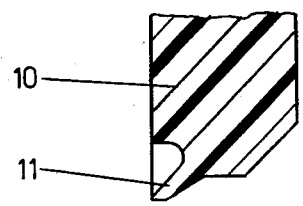
FIG. 7 shows a detail Z of the damping ring of FIG. 5.

With reference to FIG. 1, a self-centering clutch bearing 1 is arranged on a sliding sleeve 2. The clutch bearing 1 consists of a massive inner race 3 having an axially extending portion 4 coming into contact with the clutch diaphragm spring, not shown. A cage 5 guides and retains rolling elements such as the balls 6. The outer race 7 is of sheet metal, drawn to a larger scale in FIG. 3, having a flange 8 directed radially inward in radially displaceable contact with a pressure plate 9, connected to the sliding sleeve 2, and a damping ring 10. The damping ring 10, shown separately in FIGS. 5 to 7, has on its periphery an encircling lip 11 (FIG. 7) inclined towards the rolling elements. The lip 11, upon insertion in the bore 12 of the outer race 7, is turned towards the centerline of the bearing and presses against the bore surface, so that the damping ring 10 seals the clutch bearing 1 against grease leakage on the side away from the clutch. On the side towards the clutch, the bearing 1 is sealed by a sheet metal cap 13 secured to the rim, directed radially outward, of the outer race 7.

Figure 2:
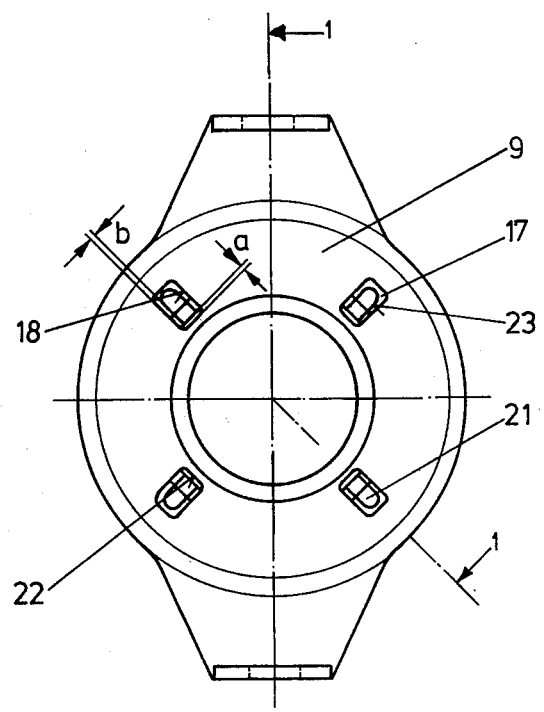
FIG. 2 shows a right side view of the clutch disengagement device of FIG 1.
Figure 4:
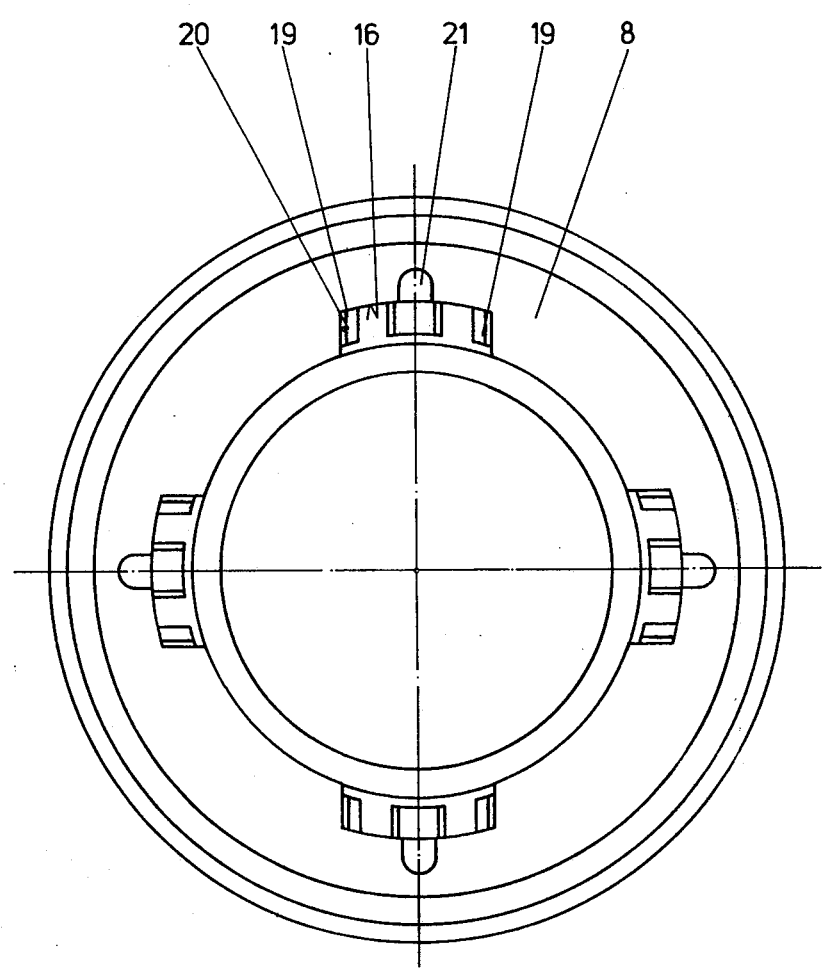
FIG. 4 shows a right side view of the outer race of FIG. 3 with damping ring in place.

The damping ring 10, on one face, has for example four damping elements 14 (FIG. 6) molded on, evenly spaced around the circumference, each consisting of two elastic tabs 15 arranged a short distance apart in the circumferential direction. The two tabs 15 of a damping member 14 are V-shaped, and arranged to protrude through apertures 16 (FIG. 4) in the flange 8 of the outer race 7 into recesses 17 (FIG. 2) of the pressure plate 9, and have their ends in contact with radially extending lateral surfaces 18 of the recesses 17. The damping ring 10 is secured against rotation in circumferential direction by two axially directed projections 19 molded on, each in contact with the radial surfaces 20 of an aperture 16 in the outer race 7. The tabs 15 of a damping member 14 are arranged between two projections 19, so that for each two projections 19 and two spring tabs 15, only one aperture 16 in the flange 8 of the outer race 7 is required. Radially over each damping member 14, end stops 21 are molded into the flange 8 of the outer race 7 to limit the radial displacement of the clutch bearing 1, which stops enter the recesses 17 in the plate 9 together with the damping members 14. The rectangular recesses 17 in plate 9, diametrically opposed to each other in pairs, with two mutually parallel lateral surfaces 18 of a recess 17 extending in radial direction, are so formed that when the clutch bearing 1 is concentrically arranged, the radial distance "a" between the damping members 14 and one lateral surface 22 of recesses 17 is the same size as the distance "b" between the lateral surfaces 18 of recesses 17 and the radially directed surfaces 23 of the end stops. As a result of this, the damping members 14 cannot be damaged upon maximum displacement of the clutch bearing 1, and a damping of relative movements in both radial and circumferential direction is achieved.

This invention is not limited to the embodiment described by way of example. Various design modifications within the spirit and scope of the present invention will be apparent to those skilled in the art. Thus, for example, in the plate 9, instead of four recesses 17, three or more than four recesses 17 may be provided to be entered by corresponding numbers of end stops 21 and damping members 14.

What is claimed is:

1. In a noise reducing clutch disengagement device for clutches, operable with a pressure plate and including a clutch bearing having rolling elements and adapted to be radially displaceable with respect to a sliding sleeve means, said bearing a fixed race having a radially directed flange abutting said pressure plate fixedly mounted with respect to said sleeve means, the improvement wherein said flange includes a plurality of circumferentially spaced apertures extending axially therethrough, said fixed race having a damping ring coupled thereto and contacting said flange on a first side thereof facing toward the rolling elements, a plurality of damping members distributed circumferentially on said damping ring, said pressure plate including a plurality of recesses, said damping members passing through said apertures in said flange and entering said recesses in said pressure plate.

2. The clutch disengagement device of claim 1, wherein each damping member comprises two elastic tabs in contact with radially directed lateral surfaces of each recess in said plate.

3. The clutch disengagement device of claim 2, wherein said tabs of a damping member are V-shaped.

4. The clutch disengagement device of claim 1, wherein said apertures have radially extending lateral surfaces and said damping ring comprises axially directed projections integral therewith, said projections being in contact with said lateral surfaces.

5. The clutch disengagement of claim 1, wherein each damping member comprises a damping element arranged circumferentially between two axially directed projections.

6. The clutch disengagement device of claim 1, wherein said fixed race includes a plurality of integral end stops adjacent said apertures, entering with clearance into said recesses of said plate.

7. The clutch disengagement device of claim 1, further comprising an end stop arranged radially over each damping member.

8. The clutch disengagement device of claim 7, wherein said clutch bearing is concentrically arranged, the radial distance between a damping member and one lateral surface of a recess being the same size as the distance between a lateral surface of said recess and the radially directed surfaces of said end stops.

9. The clutch disengagement device according to claim 1, wherein said damping ring has an encircling lip inclined towards said rolling elements, the outside diameter of said lip in uninstalled condition being greater than the diameter of said bore of the fixed race on which the damping ring is arranged.

10. In a noise reducing clutch disengagement device for motor vehicle clutches operable with a pressure plate and including, a clutch bearing having rolling elements and adapted to be radially displaceable with respect to a sliding sleeve means, said bearing including a fixed race having a radially directed flange abutting said pressure plate fixedly mounted with respect to said sleeve means, said flange comprising a plurality of circumferentially spaced apertures extending axially therethrough, said fixed race having a damping ring coupled thereto and contacting said flange on a first side thereof facing toward the rolling elements, said damping ring comprising at least three damping members distributed circumferentially thereon, said pressure plate including a plurality of recesses, said damping members passing through said apertures in said fixed race and entering said recesses in said pressure plate.

11. In a clutch disengagement device operable with a pressure plate and including a clutch bearing which has rolling elements and is adapted to be radially displaceable with respect to a sliding sleeve, the improvement wherein (a) said bearing comprises a fixed race having a radially directed flange abutting said pressure plate, the pressure plate being fixedly mounted with respect to said sliding sleeve, said flange having a first side thereof facing toward said rolling elements, said flange including a plurality of circumferentially spaced apertures extending axially therethrough, (b) said device further comprises a damping ring secured to said flange on said first side thereof, with a plurality of damping members distributed circumferentially on said damping ring and extending axially therefrom in the direction away from said rolling elements and toward said pressure plate, and (c) said pressure plate comprises means for engaging each of said damping members, said damping members on the damping ring, said apertures in said flange, and said means for engaging said damping members all having generally the same circumferential spacing pattern, with said damping members extending axially through said engaging said apertures and further extending to and engaging said engaging means on said pressure plate.

12. A device according to claim 11 wherein (a) each damping member comprises an elastic damping element having first circumferential and radial dimensions and extending axially and a pair of elastic damping tabs each being circumferentially spaced from one side of said damping element and extending axially similarly to said damping element, whereby each damping member defines second circumferential and radial dimensions, (b) each of said flange apertures has circumferential and radial dimensions corresponding to those of said damping member and through which said member extends, and (c) each of said pressure plate recesses has circumferential and radial dimensions generally corresponding to but slightly greater than those of said damping element.

13. A device according to claim 12 wherein each damping element and the recess into which it extends define radial clearance therebetween generally the same as circumferential clearance therebetween.

* * * * *